United States Patent [19]

Sagi et al.

[11] Patent Number: 4,839,192
[45] Date of Patent: Jun. 13, 1989

[54] HARD BUTTER COMPOSITION CONTAINING TRIGLYCERIDES, AND PROCESS FOR PRODUCTION THEREOF

[75] Inventors: Nobuo Sagi, Izumisano; Tsugio Izumi; Haruyasu Kida, both of Sennan; Hirokazu Maeda, Sakai, all of Japan

[73] Assignee: Fuji Oil Company, Limited, Osaka, Japan

[21] Appl. No.: 939,709

[22] Filed: Dec. 5, 1986

[30] Foreign Application Priority Data

Dec. 7, 1985 [JP] Japan .................. 60-275804

[51] Int. Cl.$^4$ ............................................. A23D 3/00
[52] U.S. Cl. ................................. 426/607; 426/601
[58] Field of Search .................. 426/601, 607, 608; 435/134, 135

[56] References Cited

U.S. PATENT DOCUMENTS

| | | | |
|---|---|---|---|
| 3,492,130 | 1/1970 | Harwood | 426/607 |
| 3,494,944 | 2/1970 | Seiden | 426/607 |
| 3,949,105 | 4/1976 | Wieske et al. | 426/607 |
| 4,485,172 | 11/1984 | Gierhart | 435/134 |
| 4,590,087 | 5/1986 | Pronk et al. | 426/607 |
| 4,719,178 | 1/1988 | Macrae et al. | 435/134 |

*Primary Examiner*—Barry S. Richman
*Assistant Examiner*—Timothy M. McMahon
*Attorney, Agent, or Firm*—Wenderoth, Lind & Ponack

[57] ABSTRACT

A hard butter composition suitable for a cocoa butter substitute which comprises as a main ingredient a triglyceride SUS, constituent saturated fatty acids of which contain at least 4% by weight of one or a plurality of fatty acids selected from the group consisting of behenic acid, lignoceric acid, cerotic acid and arachidic acid, provided that the amount of arachidic acid is less than 4% by weight based on the total weight of the constituent saturated fatty acids.

5 Claims, No Drawings

HARD BUTTER COMPOSITION CONTAINING TRIGLYCERIDES, AND PROCESS FOR PRODUCTION THEREOF

FIELD OF THE INVENTION

The present invention relates to a hard butter composition. More particularly, the hard butter composition of the present invention imparts soft mouth feel at a low temperature as well as improved high-temperature resistance and improved anti-blooming property to fatty confectionery such as chocolate produced by using the composition instead of a part or all of cocoa butter.

BACKGROUND OF THE INVENTION

U.K. Patent No. 827172 (1960) teaches that a mixture (hard butter) obtained by mixing a palm mid-fraction, and Borneo tallow or a Borneo tallow type fat such as *Shorea robusta*, etc. in a ratio of 25:75 to 75:25 is good for a cocoa butter substitute. According to the specification of this U.K. Patent, Borneo tallow or the Borneo tallow type fat used contains not less than 50%, preferably, not less than 60% of triglycerides composed of one unsaturated fatty acid residue (U) substantially derived from oleic acid (O) and two saturated fatty acid residues (S) rich in those derived from palmitic acid (P) and stearic acid (St). Almost all the remaining triglycerides are those composed of two unsaturated fatty acid residues (U) and one saturated fatty acid residue (S). Further, according to the specification, it is desirable to minimize the amount of triglycerides composed of three saturated fatty acid residues (SSS) and/or three unsaturated fatty acid residues (UUU).

An analogous technique is disclosed in Japanese Patent Laid Open Publication No. 115863/1978. This publication teaches a hard butter containing triglycerides composed of saturated fatty acid residues substantially derived from fatty acids selected from P, St and arachic acid and unsaturated fatty acid residues substantially derived from fatty acids selected from O and linoleic acid, wherein the amount of the residue derived from arachidic acid is 4 to 15% based on total of S, and the amount of the residue derived from linoleic acid is not more than 20% based on total of U. The constituent triglycerides of this hard butter contain 50 to 80%, preferably, 55 to 75% of SUS ($\beta$-unsaturated- $\alpha,\alpha'$-disaturated triglyceride); 15 to 50%, preferably, 25 to 45% of SUU ($\alpha$ or $\alpha'$-saturated diunsaturated triglyceride); 1 to 5, preferably, 1 to 3% of SSS: not more than 5%, preferably, not more than 3% of USU ($\alpha$ or $\alpha'$-diunsaturated triglyceride): and not more than 6%, preferably, not more than 4% of UUU.

The constituent triglycerides of *Shorea robusta* disclosed in the above U.K. Patent Specification contain a relatively large amount of arachic acid residue in addition to the residues derived from P and St. However, they scarcely contain fatty acid residues derived from fatty acids having longer carbon chains. Further, although the amount of arachic acid is defined in the above Japanese Patent Laid Open Publication, it does not teach the effect of fatty acids having longer carbon chains as constituent fatty acids of triglycerides.

On the other hand, Japanese Patent Publication No. 27497/1985 discloses a process for producing a trans-acid type hard butter having a specific fatty acid composition consisting of elaidic acid, palmitic acid, behenic acid and other fatty acids, wherein the fatty acid residues are randomly distributed. However, such a trans-acid type hard butter has inferior miscibility with cocoa butter (i.e., difficulty of uniform crystallization during a tempering step) and, therefore, has drawbacks, for example, poor taste of fatty confectionery such as chocolate produced by using the hard butter due to significant limitation to the amount of coca-liquor.

By the way, recently, preference for food has tended to be for soft food. On the other hand, in this field, it has been requested to develop a hard butter which maintains a certain degree of hardness even at a high temperature, and does not produce or is hard to produce "fat blooming". However, both of these requested properties are quite inconsistent with each other and it is very difficult to impart both properties to a hard butter, simultaneously. In addition, a hard butter to be used as a cocoa butter substitute should have such a property that it should melt rapidly and sharply at about body temperature. Further, workability of tempering thereof is also an important factor. In this regard, even if the difference in compositions of hard butters is only a very little, the above property and factor are significantly varied, and it is very difficult to find a relation between properties and compositions of hard butters even for those skilled in the art. For example, although a fat or oil containing a large amount of diglycerides and/or dihydroxy fatty acid glycerides advantageously effects improvement of antiblooming property, tempering is inhibited because formation of crystal nucleus and crystal growth in a tempering step are slow and, in general, excess cooling is required, which results in inconveniences during working such as slow solidification rate, difficulty in release from a mold in a molding step, etc.

The present inventors have intensively studied to obtain a hard butter which has mouth feel suitable for imparting soft biting property, and also has a certain degree of hardness at a high temperature with good antiblooming property as well as good workability during production such as in a tempering step and, in addition, can rapidly and sharply melt at about body temperature. As the result, it has been found that triglycerides containing saturated fatty acids having carbon chains which are longer than or the same as that of arachic acid as the constituent saturated fatty acids at $\alpha$ and/or $\alpha'$ make it possible to obtain a hard butter having both suitable anti-blooming property and good miscibility with cocoa butter without diglycerides or dihydroxy fatty acid glycerides which inhibit tempering, and to produce fatty confectionery such as chocolate having softer mouth feel.

OBJECTS AND SUMMARY OF THE INVENTION

The main object of the present invention is to provide a hard butter composition having improved high-temperature resistance and improved anti-blooming property which is suitable for a cocoa butter substitute.

This object as well as other objects and advantages of the present invention will become apparent to those skilled in the art from the following description.

According to the present invention, there is provided a hard butter composition which comprises as a main ingredient a triglyceride SUS, constituent saturated fatty acids of which contain at least 4% by weight of one or a plurality of fatty acids selected from the group consisting of behenic acid, lignoceric acid, cerotic acid and arachidic acid, provided that the amount of arachidic acid is less than 4% by weight based on the total weight of the constituent saturated fatty acids.

DETAILED EXPLANATION OF THE INVENTION

The main ingredient of the composition of the present invention is the triglyceride SUS. The constituent saturated fatty acids thereof contain at least 4% by weight of one or a plurality of fatty acids selected from the group consisting of behenic acid, lignoceric acid, cerotic acid and arachidic acid, provided that the amount of arachidic acid, if any, is always less than 4% by weight based on the total weight of all constituent saturated fatty acids of the glyceride. When the amount of these saturated fatty acids is lower than 4% by weight, the desired improvement can not be obtained. On the other hand, when the total amount of behenic acid, lignoceric acid, cerotic acid and arachidic acid increases too much in a fatty confectionery, difficulty arises in tempering and the melting point is remarkably depressed. Accordingly, preferably, the total amount of behenic acid, lignoceric acid, cerotic acid and arachidic acid is not more than 30% by weight based on the total amount of all the constituent saturated fatty acids of the glyceride. The constituent saturated fatty acids of the glyceride other than behenic acid, lignoceric acid, cerotic acid and arachidic acid are substantially composed of fatty acids having not less than 16 carbon atoms, i.e., P and St.

The composition of the present invention contains the triglyceride SUS in an amount of, preferably, 50% by weight or more, more preferably, 65% by weight or more based on the total amount of triglycerides in the composition. The composition can contain other triglycerides such as SUU, SSS, SSU, USU and UUU, provided that U should be substantially free from elaidic acid, that is, the content of elaidic acid is usually not more than 3% by weight based on the total amount of fatty acids of triglycerides. The amounts of SSS, SSU, USU and UUU are preferably not more than 6% by weight, more preferably, not more than 3% by weight based on the total amount of triglycerides in the composition, respectively. When the contents of SSS, SSU, and USU are too high, viscosity is abnormally increased in the tempering step. When the content of UUU is too high, high-temperature resistance of the product becomes inferior. The composition may contain a relatively higher amount of SUU. The total triglyceride content of the composition is preferably not less than 90% by weight, more preferably not less than 97% by weight based on the weight of the composition.

The hard butter composition of the present invention is a fat having the above desired triglyceride composition or a mixture of such a fat and other fat ingredients suitable for a cocoa butter substitute such as palm mid-fraction.

The fat having desired triglyceride composition can be produced by processing of natural fats and oils or synthesis of glycerides. For example, the fat can be produced by using natural fats and oils such as Niam Fat (kernel oil of *Lophira alata, Lophira ochnaceae, Lophira proceral*) and the like as starting materials, or by using processed fats and oils obtained by introducing fatty acids having desired longer carbon chains derived from botanical wax components and the like into the fats and oils as starting materials. Introduction of suitable fatty acids into fats and oils is carried out according to a conventional method, for example, as follows.

Fats and oils containing unsaturated fatty acids having not less than 20 carbon atoms such as rapeseed oil, black mustard oil, white mustard oil, radish seed oil, fish oils such as herring oil and sardine oil, whale oil, liver oil such as that from shark, plant wax such as rice bran wax and the like can be used as sources for fatty acids to be introduced into fats and oils by subjecting them to suitable known means such as hydrogenation, hydrolysis and the like. The fat having desired triglyceride composition can be produced by selectively introducing the fatty acids in the above source or fatty esters obtained by conventional esterification of the fatty acids with monovalent alcohol into $\alpha$ and $\alpha'$ positions of a fat or oil rich in unsaturated fatty acids residues at $\beta$ position thereof, for example, oleic safflower oil, camelia oil, palm oil, rapeseed oil, shea fat, sal fat, mango fat, kokum butter, Borneo tallow, malabar fat or their fractionated oil according to a known selective transesterification and, if necessary, fractionating and removing high melting point and/or low melting point fractions of the resulting fat or oil (i.e., fractionation of the midfraction rich in SUS). These selective transesterification and fractionation of the midfraction are disclosed by, for example, Japanese Patent Laid Open Publication No. 127094/1981 corresponding to U.S. Pat. No. 4,416,991).

Optionally, the fat thus obtained is mixed with other fat, particularly SUS rich fat such as palm-mid fraction according to a conventional method to give the hard butter composition of the present invention. Or the fat thus obtained can be directly mixed with cocoa butter during production of fat confectionery.

In the present invention, the above constituent saturated fatty acid composition of the triglyceride makes it possible to obtain a hard butter composition having soft mouth feel at a low temperature as well as improved rapid melt property at a temperature slightly lower than body temperature and improved anti-blooming property. Further, it is possible to obtain a hard butter composition having desired softness with a low content of diglycerides such as not more than 3% to eliminate inhibition of tempering (phenomenon requiring excess cooling) due to the diglycerides.

Although the mechanism for the advantageous effects attained by the present invention has not yet become completely apparent, it is considered that soft mouth feel can be imparted because the difference in the number of carbon atoms between the glyceride SUS having the saturated fatty acid residues derived from behenic acid, lignoceric acid, cerotic acid and arachidic acid, particularly, from the former three acids, and the glyceride SUS having the saturated fatty acid residues derived from only saturated fatty acids having 16 to 18 carbon atoms, which is a main ingredient of cocoa butter, is quite great and packing of respective crystalline units are relatively loose. Further, it is also considered that fat-blooming can be substantially prevnted because, between SUS type glycerides having great difference in their carbon chain length, a transfer rate of crystals from a certain crystalline form to a most stable one is lowered and growth of fat crystals which forms coarse crystals during storage is prevented. In addition, it is also considered that tempering can be carried out smoothly because the glyceride having the saturated fatty acid residues derived from behenic acid, lignoceric acid and cerotic acid is a SUS type having a high melting point and, thereby, it can become a good crystal nucleus during tempering. In this connection, it can be used as crystal seeds in a tempering step.

The following examples, reference examples and experiment further illustrate the present invention in detail but are not to be construed to limit the scope thereof. All "parts" and "%" are by weight unless otherwise stated.

EXAMPLE 1

High erucic acid rapeseed oil (10 parts) and low erucic acid rapeseed oil (90 parts) were mixed, hydrogenated (iodine value: <1), hydrolyzed and esterified to obtain ethyl ester of fatty acids. The ethyl ester (70 parts) was mixed with high oleic acid sunflower oil 30 parts) and the mixture was subjected to transesterification by using an enzyme preparation having selectivity to $\alpha$ and $\alpha'$ positions to obtain an oil (iodine value: 44.2). The resulting oil was further fractionated by using a solvent to obtain a midfraction (iodine value: 40.0, fractionation yield: 84.1%). The oil was mixed with palm mid-fraction in a ratio of 9:1 and the mixture was refined according to a conventional method to obtain a hard butter composition (hard butter A). The ingredients and solid fat index (SFI) of the hard butter A are shown in Table 1.

EXAMPLE 2

A hard butter composition (hard butter B) was obtained according to the same manner as Example 1 except that 25 parts of high erucic acid rapeseed oil and 75 parts of low erucic acid rapeseed oil were used. The ingredients and SFI of the hard butter B are shown in Table 1.

REFERENCE EXAMPLE 1

A hard butter composition (hard butter C) was obtained according to the same manner as Example 1 except that 100 parts of low erucin rapeseed oil was used without using high erucin rapeseed oil. The ingredients and SFI of the hard butter C are shown in Table 1.

REFERENCE EXAMPLE 2

A hard butter composition (hard butter D) was obtained according to the same manner as Example 1 except that oil foots of sal fat were decomposed with sulfuric acid and subjected to fractional distillation to obtain a fatty acid fraction and the fatty acid fraction was extremely hydrogenated, esterified to the ethyl ester and used as a source for fatty acid to be introduced into high oleic sunflower oil. The ingredients and SFI of hard butter D are shown in Table 1.

TABLE 1

| Hard Butter | A | B | C | D | E[a] |
|---|---|---|---|---|---|
| Composition of fatty acids[b] | | | | | |
| C14 | 0.1 | 0.1 | 0.1 | 0.1 | 0.1 |
| C16 | 10.2 | 10.3 | 10.1 | 10.2 | 25.7 |
| C18 | 44.5 | 40.7 | 46.4 | 41.7 | 36.0 |
| C18 F1 | 38.7 | 37.4 | 38.7 | 38.1 | 33.9 |
| C18 F2 | 3.2 | 3.1 | 3.3 | 3.1 | 3.0 |
| C18 F3 | — | — | — | — | 0.3 |
| C20 | 0.9 | 1.3 | 0.8 | 6.3 | 1.1 |
| C20 F1 | 0.1 | 0.1 | 0.1 | 0.1 | — |
| C22 | 2.3 | 7.0 | 0.5 | 0.5 | — |
| (C20 + C22)/S | 5.5 | 14.0 | 2.2 | 10.5 | 1.7 |
| (C20)/S | 1.6 | 2.2 | 1.4 | 10.7 | 1.7 |
| Iodine value | 38.9 | 38.5 | 39.1 | 38.6 | 35.5 |
| Diglyceride % | 2.0 | 1.8 | 2.0 | 1.9 | 2.2 |

TABLE 1-continued

| Hard Butter | A | B | C | D | E[a] |
|---|---|---|---|---|---|
| SSS % | 0.9 | 1.1 | 1.2 | 1.1 | 1.3 |
| SUS, SSU %[c] | 66.3 | 68.4 | 65.8 | 68.3 | 77.9 |
| SUU, USU %[c] | 28.2 | 26.2 | 28.2 | 26.1 | 16.6 |
| UUU % | 4.6 | 4.3 | 4.8 | 4.5 | 4.2 |
| SFI | | | | | |
| 20° C. | 72.1 | 74.7 | 76.1 | 75.2 | 89.4 |
| 25° C. | 66.3 | 69.0 | 68.8 | 70.7 | 83.8 |
| 30° C. | 56.6 | 53.0 | 60.5 | 59.0 | 66.6 |
| 35° C. | 25.7 | 11.5 | 34.9 | 23.9 | 2.7 |
| 37.5° C. | 1.0 | 1.1 | 10.1 | 1.1 | 0.0 |

[a]Cocoa butter
[b]For example, C18 F1 represents the fatty acid having 18 carbon atoms and one double bond.
[c]The ratio of SSU in SUS + SSU and the ratio of USU in SUU + USU are not more than 2%.

Experiment

Hard butter A, B, C or D or Cocoa butter E (19.8 parts), cacao mass (15.7 parts), powdered whole milk (20 parts), powdered sugar (44.5 parts) and lecithin (0.5 part) were mixed and subjected to conching. Then, the mixture was subjected to tempering treatment wherein the mixture at 45° to 50° C. was cooled to 26.5° to 27.0° C. with stirring in a water bath and then the temperature of the water bath was raised (during this period, increase in viscosity was measured). When the mixture reached 28° C., it was casted in a mold and cooled at 5° C. for 30 minutes. After aging at 18° to 20° C. for 7 days, a portion of the product was stored at 30°, 31° or 32° C. for 2 hours and then its hardness was determined. Another portion of the product was further aged at 18° to 20° C. for 20 days and then it was subjected to a storage test to determine anti-blooming property, wherein storage at 20° C. for 12 hours and then at 32° C. for 12 hours was repeated and the number of repetitions necessary for producing bloom was recorded. The results of the experiment are shown in Table 2.

TABLE 2

| Hard butter | A | B | C | D | E |
|---|---|---|---|---|---|
| Increase in viscosity in tempering (kg · cm) | 0.9 | 1.25 | 1.20 | 1.40 | 0.9 |
| Difficulty of tempering | easy | easy | easy | easy | easy |
| Release from mold | good | good | good | good | good |
| Hardness | | | | | |
| 30° C. | 500 | 360 | 800 | 600 | 180 |
| 31° C. | 290 | 130 | 460 | 300 | 60 |
| 32° C. | 120 | 45 | 230 | 120 | 10 |
| Mouth feel[a] | 14 | 15 | 0 | 10 | 2 |
| Antiblooming (number) | 21 | 25 | 9 | 10 | 3 |

[a]Mouth feel was estimated by 15 panelists with respect to melt property in the mouth and soft biting property, and represented by the number of panelists who determined that mouth feel was good.

As seen from hardness in Table 2, all hard butters A to D are more resistant to a high temperature than cocoa butter E. However, hard butter C which contains less behenic acid, lignoceric acid, cerotic acid and arachic acid has inferior mouth feel because melt property in the mouth thereof is poor and it lacks soft chewing property.

Further, although the amount of arachic acid of hard butter D is substantially the same as that of behenic acid of hard butter B, the latter is superior to the former with respect to mouth feel and anti-blooming property. Hard butter A shows similar effect to hard butter B. This shows that the effect of behenic acid is superior to that of arachic acid.

REFERENCE EXAMPLE 3

According to the same manner as Example 1, a fatty fraction was recovered by using the same starting materials except that transesterification was carried out by using sodium methylate (i.e., non-selective random transesterification). The composition of this fraction is shown in Table 3. As seen from Table 3, this fatty fraction contained only 14.4% of SUS. Even if solvent fractionation was carried out, the ratio of SUS/SSU in the mid-fraction was hardly changed in comparison with that before fractionation. Then, this fatty fraction had poor miscibility with cocoa butter (i.e., difficulty in uniform crystallization in a tempering step) and inferior melt property in the mouth.

EXAMPLE 3

Ethyl ester of fatty acids obtained by extremely hydrogenating a mixture of high erucin rapeseed and low erucin rapeseed (10.5:59.5) and hydrolyzing and esterifying the product (70 parts) was mixed with high oleic sunflower oil (30 parts) and the mixture was transesterified by using an enzyme preparation having selectivity to $\alpha$ and $\alpha'$ positions. The transesterified oil was subjected to solvent fractionation to obtain a mid-fraction. The composition of this fraction is shown in Table 3. This fraction has good soft mouth feel at a low temperature and improved anti-blooming property and the fraction itself can be used as the hard butter composition of the present invention.

EXAMPLE 4

Fatty acid ethyl esters obtained by hydrolyzing hardened rice bran wax and esterifying the resulting fatty acids (6 parts), other fatty acid ethyl esters obtained by subjecting hardened low erucin rapeseed oil to ethanolysis (79 parts) and high oleic sunflower oil (15 parts) were mixed and the mixture was transesterifed by using lipase having selectivity to $\alpha$ and $\alpha'$ positions. The resulting oil was subjected to distillation to remove unreacted fatty acid ethyl esters. The oil was subjected to solution fractionation to remove high melting point fraction (4.2 %, iodine value: 8.6). The composition of the fraction obtained is shown in Table 3.

TABLE 3

| Hard butter | Reference Example 3 | Example 3 | Example 4 |
| --- | --- | --- | --- |
| Composition of fatty acids | | | |
| C16 | 5.3 | 4.8 | 4.3 |
| C18 | 61.6 | 47.1 | 51.3 |
| C18 F1 | 25.2 | 39.3 | 36.7 |
| C18 F2 | 2.0 | 3.3 | 2.8 |
| C20 | 2.4 | 1.0 | 1.4 |
| C22 | 3.5 | 4.5 | 1.1 |
| C24 | — | — | 2.4 |
| (C20 + C22 + C24)/S | 8.1 | 9.6 | 8.1 |
| (C20)/S | 3.3 | 1.7 | 2.3 |
| Iodine value | 25.2 | 39.3 | 38.0 |
| Diglyceride | 7.9 | 1.8 | 2.9 |
| SSS | 38.6 | 2.3 | 1.1 |
| SUS, SSU | 43.2 | 63.4 | 65.4 |
| SUU, USU | 16.2 | 30.3 | 27.5 |
| UUU | 2.0 | 4.0 | 6.0 |

As described hereinabove, the hard butter composition of the present invention has good miscibility with cocoa butter and good soft mouth feel at a low temperature. Further, it has improved high-temperature resistance and improved anti-blooming property. Particularly, the hard butter composition containing the saturated fatty acid residues derived from behenic acid, lignoceric acid and cerotic acid has better melt property in the mouth, soft biting property and anti-blooming property than those of a hard butter composition containing the saturated fatty acid residue derived from arachidic acid.

What is claimed is:

1. A hard butter composition for a cocoa butter substitute which comprises at least 90% by weight of triglycerides based on the total weight of the composition, at least 50% by weight of said triglycerides, based on the total weight of said triglycerides, being a $\beta$-unsaturated-$\alpha,\alpha'$-disaturated triglyceride constituent having a saturated fatty acid constituent of which 4 to 30% by weight, based on the weight of said saturated fatty acid constituent, is a fatty acid selected from the group consisting of behenic acid, lignoceric acid, cerotic acid and mixtures thereof.

2. A hard butter composition according to claim 1, wherein the saturated fatty acid constituent further comprises, included within said 4 to 30%, less than 4% by weight of arachidic acid based on the total weight of the constituent saturated fatty acids.

3. A hard butter composition according to claim 1, wherein the constituent saturated fatty acids are selected from the group consisting of behenic acid and lignoceric acid.

4. A hard butter composition according to claim 1, which further comprises triglycerides other than said $\beta$-saturated-$\alpha$-$\alpha'$-disaturated triglycerides, wherein said other triglycerides are substantially an $\alpha$ or $\alpha'$-saturated, diunsaturated, triglyceride, alone or together with at least one member selected from the group consisting of a trisaturated triglyceride, an $\alpha$ or $\alpha'$-unsaturated disaturated triglyceride, an $\alpha,\alpha'$-diunsaturated-$\beta$-saturated triglyceride and a triunsaturated triglyceride each in an amount of not more than 6% by weight based on the total amount of triglycerides in the composition.

5. A hard butter composition according to claim 5, wherein the amount of each of said trisaturated triglyceride, $\alpha$ or $\alpha'$-unsaturated disaturated triglyceride, $\alpha\alpha'$-diunsaturated-$\beta$-saturated triglyceride and triunsaturated triglyceride is not more than 3% by weight based on the total amount of triglycerides in the composition.

* * * * *